US011848982B2

(12) United States Patent
Pogrebinsky et al.

(10) Patent No.: US 11,848,982 B2
(45) Date of Patent: *Dec. 19, 2023

(54) ACCESS SERVICES IN HYBRID CLOUD COMPUTING SYSTEMS

(71) Applicant: Microsoft Technology Licensing, LLC, Redmond, WA (US)

(72) Inventors: Vladimir Pogrebinsky, Redmond, WA (US); Gilles Zunino, Kirkland, WA (US); Bradley Bartz, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 70 days.

This patent is subject to a terminal disclaimer.

(21) Appl. No.: 17/553,419

(22) Filed: Dec. 16, 2021

(65) Prior Publication Data
US 2022/0109721 A1    Apr. 7, 2022

Related U.S. Application Data

(60) Continuation of application No. 16/594,268, filed on Oct. 7, 2019, now Pat. No. 11,206,304, which is a
(Continued)

(51) Int. Cl.
*G06F 15/173* (2006.01)
*H04L 67/10* (2022.01)
(Continued)

(52) U.S. Cl.
CPC ............ *H04L 67/10* (2013.01); *G06F 9/5072* (2013.01); *H04L 41/12* (2013.01); *H04L 63/10* (2013.01);
(Continued)

(58) Field of Classification Search
CPC ....... H04L 67/10; H04L 41/12; H04L 67/146; H04L 67/32; G06F 9/5072
(Continued)

(56) References Cited

U.S. PATENT DOCUMENTS 10,484,460 B2 * 11/2019 Pogrebinsky ........... H04L 63/10
11,206,304 B2 * 12/2021 Pogrebinsky ........... H04L 67/10
(Continued)

FOREIGN PATENT DOCUMENTS

| CN | 103563294 A | 2/2014 |
| CN | 104054321 A | 9/2014 |

OTHER PUBLICATIONS

"Notice of Allowance and Search Report Issued in Chinese Patent Application No. 201780044136.4", dated Jan. 10, 2022, 5 Pages.
(Continued)

*Primary Examiner* — Imad Hussain
(74) *Attorney, Agent, or Firm* — WORKMAN NYDEGGER

(57) ABSTRACT

Techniques for facilitating operations in hybrid cloud computing systems are disclosed herein. In one embodiment, a method can include receiving, at a public cloud, a plurality of applications deployable in a private cloud and informing an access service of the public cloud computing system regarding the received applications deployable in the private cloud. The method also includes receiving, from a connection service of the private cloud, a request for a list of the received applications available at the public cloud and deployable in the private cloud. The method further includes in response to the received request, selectively identifying to the private cloud the list of applications based on a service subscription associated with the connection service.

18 Claims, 12 Drawing Sheets

Related U.S. Application Data division of application No. 15/217,522, filed on Jul. 22, 2016, now Pat. No. 10,484,460.

(51) Int. Cl.
  *G06F 9/50*    (2006.01)
  *H04L 67/60*   (2022.01)
  *H04L 9/40*    (2022.01)
  *H04L 41/12*   (2022.01)
  *H04L 67/146*  (2022.01)
  *G06F 8/61*    (2018.01)

(52) U.S. Cl.
  CPC ............ *H04L 67/146* (2013.01); *H04L 67/60* (2022.05); *G06F 8/61* (2013.01)

(58) Field of Classification Search
  USPC ........................................................ 709/223
  See application file for complete search history.

(56) References Cited

U.S. PATENT DOCUMENTS

| | | | |
|---|---|---|---|
| 2014/0007079 A1* | 1/2014 | Whitney | H04L 67/10 717/176 |
| 2014/0108665 A1* | 4/2014 | Arora | H04L 67/563 709/227 |
| 2015/0295781 A1* | 10/2015 | Maes | G06F 9/5072 715/735 |

OTHER PUBLICATIONS

U.S. Appl. No. 16/594,268, filed Oct. 7, 2019.
U.S. Appl. No. 15/217,522, filed Jul. 22, 2016.
U.S. Appl. No. 16/257,968, filed Jan. 25, 2019.
U.S. Appl. No. 15/217,541, filed Jul. 22, 2016.
"Notice of Allowance Issued in European Patent Application No. 17743224.2", dated Apr. 29, 2022, 2 Pages.

* cited by examiner

ACCESS SERVICES IN HYBRID CLOUD COMPUTING SYSTEMS

CROSS-REFERENCE TO RELATED APPLICATION(S)

This application is a continuation of U.S. patent application Ser. No. 16/594,268, filed on Oct. 7, 2019, now U.S. Pat. No. 11,206,304, which is a divisional of U.S. patent application Ser. No. 15/217,522, filed on Jul. 22, 2016, now U.S. Pat. No. 10,484,460, the entire contents of which are incorporated herein by reference for all purposes.

BACKGROUND

Remote or "cloud" computing typically utilizes a collection of remote servers to provide computing, data storage, electronic communications, or other cloud services. A computer network can interconnect the remote servers as nodes to form a computing fabric with one or more computing clusters. During operation, multiple nodes in the computing fabric can cooperate to provide a distributed computing environment that facilitates execution of user applications in order to provide desired cloud services.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Cloud computing systems can be public or private. Public cloud computing systems typically offer subscriptions of cloud services to the general public. Examples of public cloud include Microsoft Azure®, Amazon Web Services®, and Google Compute®. On the other hand, corporations, universities, government entities, and other organizations can often have dedicated servers, datacenters, or other computing facilities configured to deploy cloud services for internal use only. Such a cloud computing system is often referred to as a private cloud.

One drawback of a private cloud is that users of the private cloud often do not have access to applications published in a public cloud. For example, independent software vendors ("ISVs") can develop various types of applications and "publish" or make the applications available to other users in a public cloud. Other users can then download, purchase, rent, or otherwise deploy and use the published applications in the public cloud. However, the ISVs typically cannot directly publish developed applications to a private cloud due to strict access control in the private cloud. As such, applications available in a public cloud are often not available to users of a private cloud.

Also, implementing a private cloud can be expensive. Organizations typically purchase and/or license expensive software of a cloud computing platform to be deployed in private servers or datacenters. An alternative cost structure is a usage-based cost structure under which an organization only pays for actual usage of the software with little or no upfront costs. However, implementing usage-based cost structure can be difficult in a private cloud because software providers typically do not have access to any usage data in a private cloud due to strict access control in the private cloud.

Several embodiments of the disclosed technology can address at least some of the foregoing drawbacks by implementing an access service in a public cloud that can interface with a connection service in a private cloud. The access service can be configured to expose information in the public cloud to the connection service of the private cloud without having direct access to resources in the private cloud. For example, the access service can be configured to provide a list of applications available at the public cloud that may be deployed in the private cloud based on a service subscription associated with the connection service. The access service can also be configured to facilitate the private cloud in retrieving artifacts of the applications to facilitate publication of the applications in the private cloud.

In other examples, the access service can be configured to facilitate uploading usage data of applications from the private cloud to the public cloud. In certain embodiments, the connection service at the private cloud can contact the access service at the public cloud to obtain a permission to store usage data in a network storage in the public cloud. In response, the access service can valid credentials of the connection service and provide the permission upon validation of the credentials. With the obtained permission, the private cloud can then store usage data in the network storage. The access service can then cause performance of copying, filtering, anomaly detection, or otherwise processes on the stored usage data in the network storage.

Several embodiments of the disclosed technology can allow one or more private clouds to become extension(s) of a public cloud without compromising strict access control associated with the private clouds. Instead of having direct access to resources in the private clouds, the access service at the public cloud exposes information and facilitates access to various resources available at the public cloud. As such, administrators of the private clouds can select, retrieve, and deploy various resources available at the public cloud while maintaining strict access control of the private clouds. With permission of the public cloud, the private clouds can also upload usage data to the public cloud periodically or in other suitable manners. As a result, usage-based cost structures may be implemented for software of cloud computing platform or applications deployed in private clouds.

DETAILED DESCRIPTION

Figure 1:
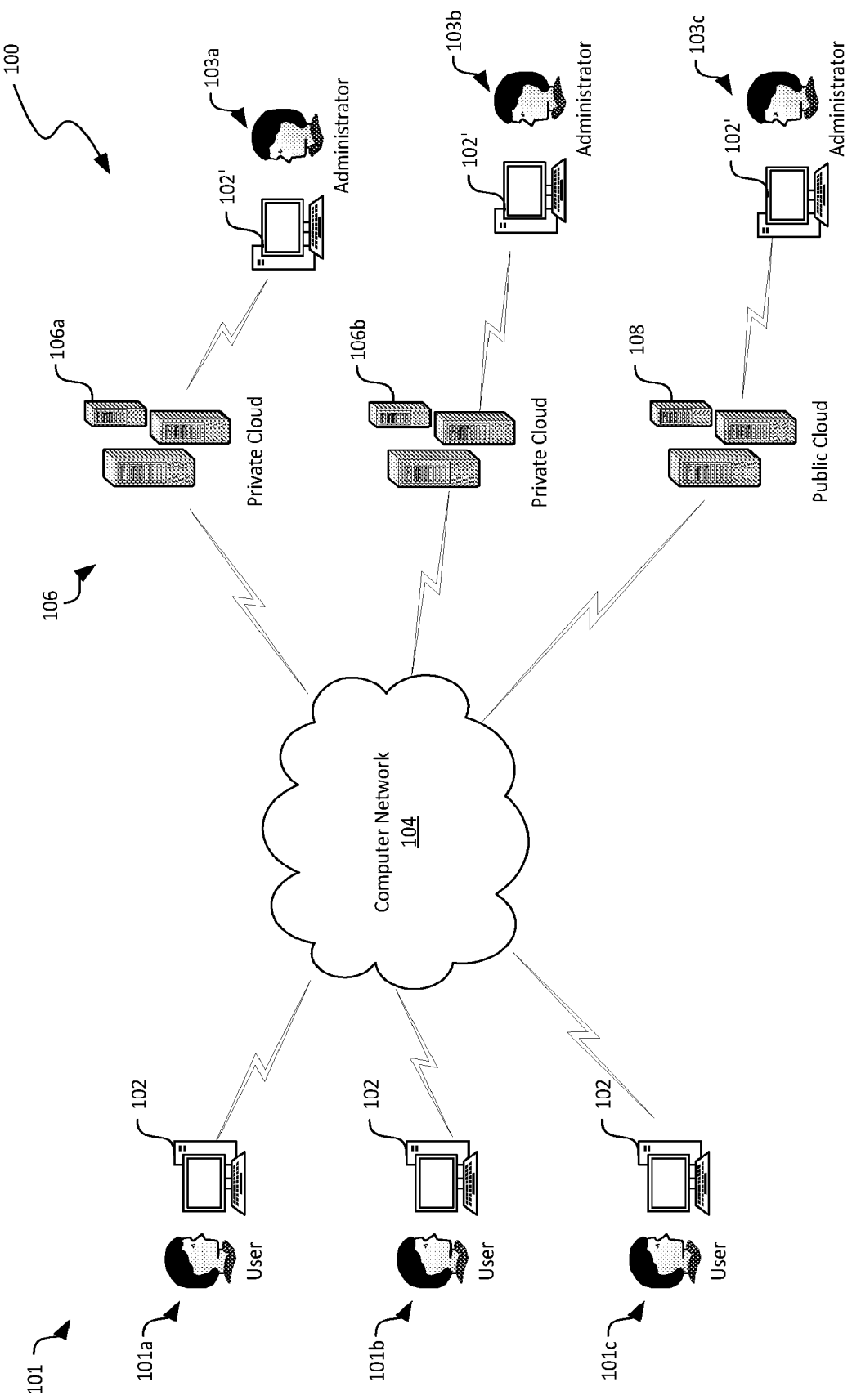
FIG. 1 is a schematic diagram of a hybrid cloud computing system in accordance with embodiments of the disclosed technology.

Certain embodiments of computing systems, devices, components, modules, routines, and processes for facilitating operations between a public cloud and a private cloud are described below. In the following description, specific details of components are included to provide a thorough understanding of certain embodiments of the disclosed technology. A person skilled in the relevant art can also understand that the disclosed technology may have additional embodiments or may be practiced without several of the details of the embodiments described below with reference to FIGS. 1-7.

As used herein, the term "cloud computing system" or "cloud" generally refers to a computer system configured to provide various cloud computing services via a computer network. A cloud computing system can include multiple network devices interconnecting a large number of remote servers or nodes to one another and/or to external networks (e.g., the Internet). In one example, a cloud computing system can include multiple containers, racks, or other suitable enclosures each holding multiple servers in a cloud computing datacenter (or portions thereof). The term "network device" generally refers to a network communications component. Example network devices include routers, switches, hubs, bridges, load balancers, security gateways, or firewalls. A "node" generally refers to a computing device configured to implement one or more virtual machines, virtual routers, virtual gateways, or other suitable virtualized computing components. For example, a node can include a computing server having a hypervisor configured to support one or more virtual machines.

As used herein, the term "public cloud" or "public cloud computing system" generally refers to a cloud computing system that provides subscription of cloud services to the general public. Examples of public cloud include Microsoft Azure®, Amazon Web Services®, and Google Compute®. In contrast, the term "private cloud" or "private cloud computing system" generally refers to a cloud computing system for internal use of and under strict access control of an organization due to security, data protection, privacy, or other concerns. A public cloud or users outside of an organization typically do not have access to a private cloud of the organization. The term "hybrid cloud" generally refers to a cloud computing system having a portion being a public cloud interconnected to another portion that is a private cloud. As discussed in more detail below, several embodiments of the disclosed technology can allow interactions between the public cloud and the private cloud while generally maintaining strict access control at the private cloud.

Also used herein, the term "cloud computing service" or "cloud service" generally refers to one or more computing resources provided over a computer network such as the Internet. Example cloud services include software as a service ("SaaS"), platform as a service ("PaaS"), and infrastructure as a service ("IaaS"). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

Also used herein, the term "resource provider" generally refers to a cloud service that is configured to provide or make available one or more resources of a public or private cloud. The one or more resources can be deployed and managed through, for example, a resource manager accessible via a user portal. In certain embodiments, a resource provider can be configured to offer representational state transfer ("REST") Application Programming Interfaces ("APIs") for working with associated resources. For example, a resource provider can be configured to deploy a key vault for storing keys and credentials. This resource provider can provide an example resource type called "vault" for creating a key vault, and another example resource type called "vault/secret" for creating a secret in the key vault. In other embodiments, resource providers can also provide computing resources (e.g., virtual machines), storage resources (e.g., network storage), network resources (e.g., virtual networks), database resources (e.g., database servers), or other suitable types of resources.

A private cloud can provide users of an organization with cloud services that are secure and/or private by imposing strict access control. However, such strict access control can have several drawbacks. In one example, applications developed by ISVs and available in a public cloud are often not available to users in a private cloud. In another example, usage based cost structure can be difficult to implement in a private cloud because software providers typically do not have access to any usage data in a private cloud. Several embodiments of the disclosed technology can address at least some of the foregoing drawbacks by implementing an access service in a public cloud to interface with a connection service in a private cloud. The access service can expose various resources of the public cloud to the private cloud as well as facilitating data upload from the private cloud to the public cloud. As a result, applications available at the public cloud can be published in the private cloud, and usage data in the private cloud can be uploaded to the public cloud to allow implementation of usage based cost structure, as described in more detail below with reference to FIGS. 1-7.

FIG. 1 is a schematic diagram illustrating a hybrid cloud computing system 100 in accordance with embodiments of the disclosed technology. As shown in FIG. 1, the hybrid cloud computing system 100 can include a public cloud 108 and one or more private clouds 106 interconnected with client devices 102 of users 101 via a computer network 104. The computer network 104 can include an enterprise intranet, a social network, the Internet, or other suitable types of network. One example computer network 104 is described in more detail below with reference to FIG. 2A.

Even though particular components and associated arrangements of the hybrid cloud computing system 100 are shown in FIG. 1, in other embodiments, the hybrid cloud computing system 100 can include additional and/or different components. For example, in the illustrated embodiment, the hybrid cloud computing system 100 includes two, i.e., first and second private clouds 106a and 106b. In other embodiments, the hybrid cloud computing system 100 can include three, four, or any other suitable number of private clouds 106. In further embodiments, the hybrid cloud computing system 100 can also include web servers, domain name servers, or other suitable components.

The client devices 102 can individually include a computing device that facilitates access to the public cloud 108 and/or the private clouds 106 via the computer network 104 by users 101. For example, in the illustrative embodiment, the client devices 102 individually include a desktop computer. In other embodiments, the client devices 102 can also include laptop computers, tablet computers, smartphones, or other suitable computing devices. Even though three users 101 are shown in FIG. 1 for illustration purposes, in other embodiments, the hybrid cloud computing system 100 can facilitate any suitable number of users 101 access to the public cloud 108 and/or the private clouds 106 via the computer network 104.

The public cloud 108 and the private clouds 106 can be individually configured to provide subscriptions of certain cloud services to the users 101. As shown in FIG. 1, the public cloud 108 is open to the general public. As such, all users 101 can have access to the public cloud 108. On the other hand, the private clouds 106 can have strict access control. As such, only users 101 who are authorized may access the private clouds 106. For example, first and second users 101a and 101b can be authorized to access the first and second private clouds 106a and 106b, respectively, but not the third user 101c. As such, the third user 101c has no access to either of the first or second private cloud 106a and 106b while having access to the public cloud 108.

As shown in FIG. 1, first, second, and third administrators 103a-103c can manage the first private cloud 106a, the second cloud 106b, and the public cloud 108, respectively, via additional client devices 102'. However, the third administrator 103c of the public cloud 108 has no access to either of the private clouds 106. As described in more detail below, several embodiments of the disclosed technology are directed to implementing a resource provider (referred to below as "an access service") at the public cloud 108 that can interface with another resource provider (referred to below as "a connection service") at a private cloud 106. The access service can allow the first and second administrators 103a and 103b of the private clouds 106 to have access to resources available at the public cloud 108 as well as upload usage data from the private clouds 106 to the public cloud 108. As such, the private clouds 106 can become extensions of the public cloud 108 to enable publication of applications from the public cloud 108 to the private clouds 106 as well as implementing usage-based cost structures in the private clouds 106. Example components of a cloud computing system suitable for either the public cloud 108 or the private clouds 106 are described in more detail below with reference to FIGS. 2A-2B.

Figure 2A:
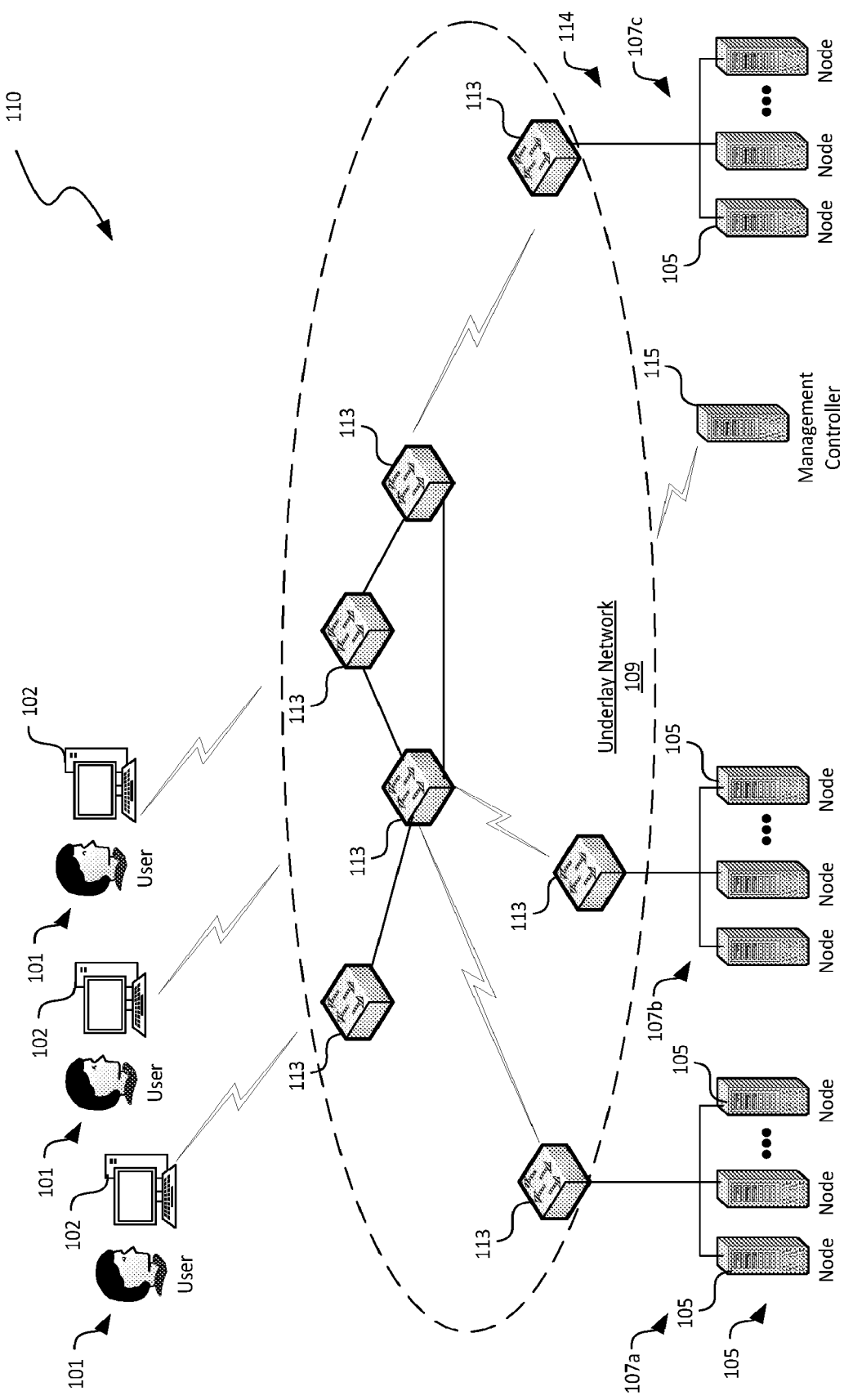
FIG. 2A is a schematic diagram illustrating a cloud computing system suitable for the hybrid cloud computing system in FIG. 1 in accordance with embodiments of the disclosed technology.

FIG. 2A is a schematic diagram illustrating a cloud computing system 110 suitable for either the public cloud 108 or the private clouds 106 of FIG. 1 in accordance with embodiments of the disclosed technology. As shown in FIG. 2A, the cloud computing system 110 can include an underlay network 109 interconnecting a plurality of client devices 102 associated with users 101 and a computing fabric 114. Even though particular components of the cloud computing system 110 are shown in FIG. 2A, in other embodiments, the cloud computing system 110 can also include additional and/or different constituents. For example, the cloud computing system 110 can also include additional computing fabrics (not shown) interconnected with one another, network storage devices, utility infrastructures, and/or other suitable components.

As shown in FIG. 2A, the underlay network 109 can include one or more physical network devices 113 that interconnect the users 101 and the computing fabric 114. Examples of the network devices 113 can include routers, switches, firewalls, load balancers, or other suitable network components. Even though particular connection scheme is shown in FIG. 2A for illustration purposes, in other embodiments, the network devices 113 can be operatively coupled in a hierarchical, flat, "mesh," or other suitable topologies.

As shown in FIG. 2A, the computing fabric 114 can include a plurality of nodes 105 operatively coupled to one another by the network devices 113. In certain embodiments, the nodes 105 can individually include a processor, a physical server, or several physical servers. In other embodiments, the nodes 105 can also include a virtual server or several virtual servers. The nodes 105 can be organized into racks, availability zones, groups, sets, computing clusters, or other suitable divisions. For example, in the illustrated embodiment, the nodes 105 are grouped into three computing clusters 107 (shown individually as first, second, and third computing clusters 107a-107c, respectively), which are operatively coupled to corresponding network devices 113 in the underlay network 109. Even though three computing clusters 107 are shown in FIG. 2A for illustration purposes, in other embodiments, the computing fabric 114 can include one, two, eight, sixteen, or any other suitable numbers of computing clusters 107 with similar or different components and/or configurations.

As shown in FIG. 2A, the computing fabric 114 can also include a management controller 115 configured to monitor, control, or otherwise manage operations of the nodes 105 in the computing clusters 107. For example, in certain embodiments, the management controller 115 can include a fabric controller configured to manage processing, storage, communications, or other suitable types of hardware resources in the computing clusters 107 for hosting cloud services. In other embodiments, the management controller 115 can also include a datacenter controller, application delivery controller, or other suitable types of controller. In the illustrated embodiment, the management controller 115 is shown as being separate from the computing clusters 107. In other embodiments, the management controller 115 can include one or more nodes 105 in the computing clusters 107. In further embodiments, the management controller 115 can include software services hosted on one or more of the nodes 105 in the computing clusters 107.

In operation, the users 101 can request deployment of a cloud service via, for example, a user portal (not shown). For example, a user 101 can request instantiation of a virtual machine 145 (shown in FIG. 2B). In response to receiving the request from the user 101, the management controller 115 can verify a subscription level of the user 101, and provision for instantiation of a virtual machine upon verification. The management controller 115 can then cause one or more of the nodes 105 to instantiate the requested virtual machine 145, as described in more detail below with reference to FIG. 2B.

Figure 2B:
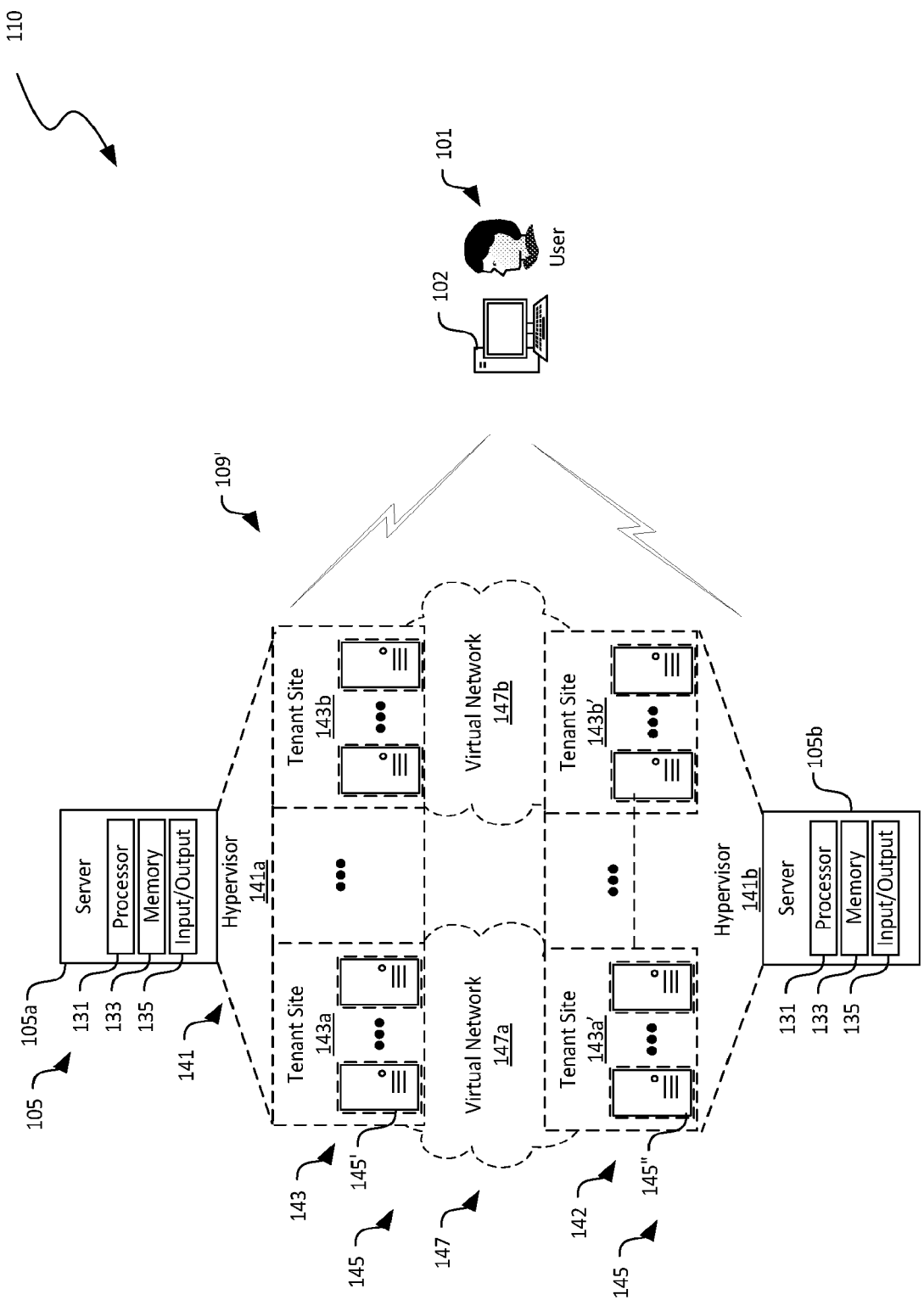
FIG. 2B is a schematic diagram illustrating certain hardware/software components of the cloud computing system in FIG. 2A in accordance with embodiments of the disclosed technology.

FIG. 2B is a schematic diagram illustrating an example overlay network 109' implemented on the underlay network 109 and suitable for the cloud computing system 110 of FIG. 2A in accordance with embodiments of the disclosed technology. In FIG. 2B, only certain components of the underlay network 109 of FIG. 2A are shown for clarity. As shown in FIG. 2B, a first node 105a and the second node 105b can each include a processor 131, a memory 133, and an input/output component 135 operatively coupled to one another. The processor 131 can include a microprocessor, a field-programmable gate array, and/or other suitable logic devices. The memory 133 can include volatile and/or non-volatile media (e.g., ROM; RAM, magnetic disk storage media; optical storage media; flash memory devices, and/or other suitable storage media) and/or other types of computer-readable storage media configured to store data received from, as well as instructions for, the processor 131 (e.g., instructions for performing the methods discussed below with reference to FIGS. 6A-6D). The input/output component 135 can include a display, a touch screen, a keyboard, a mouse, a printer, and/or other suitable types of input/output devices configured to accept input from and provide output to an operator and/or an automated software controller (not shown).

The memory 133 of the first and second nodes 105a and 105b can include instructions executable by the processors 131 to cause the individual processors 131 to provide a hypervisor 141 (identified individually as first and second hypervisors 141a and 141b) and other suitable components (not shown). The hypervisors 141 can individually be configured to initiate, monitor, terminate, and/or otherwise locally manage one or more virtual machines 145 organized into tenant sites 143. For example, as shown in FIG. 2B, the first node 105a can provide a first hypervisor 141a that manages first and second tenant sites 143a and 143b, respectively. The second node 105b can provide a second hypervisor 141b that manages first and second tenant sites 143a' and 143b', respectively. The hypervisors 141 can be software, firmware, or hardware components. The tenant sites 143 can each include multiple virtual machines 145 or other suitable tenant instances for a particular user 101. For example, the first node 105a and the second node 105b can both host the tenant site 142a and 142a' for the user 101. The first node 105a and the second node 105b can both host the tenant site 143b and 143b' for the second user 101b (FIG. 1). Each virtual machine 145 can be executing a corresponding operating system, middleware, and/or applications.

Also shown in FIG. 2B, the cloud computing system 110 can include an overlay network 109' having one or more virtual networks 147 that interconnect the tenant sites 143a and 143b across multiple nodes 105. For example, a first virtual network 147a interconnects the first tenant sites 143a and 143a' at the first node 105a and the second node 105b. A second virtual network 147b interconnects the second tenant sites 143b and 143b' at the first node 105a and the second node 105b. Even though a single virtual network 147 is shown as corresponding to one tenant site 143, in other embodiments, multiple virtual networks 147 (not shown) may be configured to correspond to a single tenant site 143.

The virtual machines 145 on the virtual networks 147 can communicate with one another via the underlay network 109 (FIG. 2A) even though the virtual machines 145 are located on different nodes 105. Communications of each of the virtual networks 147 can be isolated from other virtual networks 147. In certain embodiments, communications can be allowed to cross from one virtual network 147 to another through a security gateway or otherwise in a controlled fashion. A virtual network address can correspond to one of the virtual machine 145 in a particular virtual network 147. Thus, different virtual networks 147 can use one or more virtual network addresses that are the same. Example virtual network addresses can include IP addresses, MAC addresses, and/or other suitable addresses.

In certain embodiments, the virtual machines 145 hosted on one or more of the nodes 105 can be utilized to perform one or more user requested tasks. In other embodiments, the virtual machines 145 or other suitable components of the cloud computing system 110 can also be utilized to implement an access service for the public cloud 108 (FIG. 1) or a connection service for the individual private clouds 106 (FIG. 1). The access service can be configured to provide information of available resources at the public cloud 108 to the connection service of the private cloud 106. The access service can also be configured to facilitate access to network storages in the public cloud 108 by the private clouds 106. In certain embodiments, the access service or the connection service can be individually implemented as a cloud service, for example, by executing suitable instructions or code in one or more virtual machines 145 on selected nodes 105 in the computing fabric 115 (FIG. 2A). In other embodiments, access service and/or the connection service can be provided by dedicated servers or via other suitable techniques. Example components and operations of the access service and connection service are described in more detail below with reference to FIGS. 3A-5.

Figure 3A:
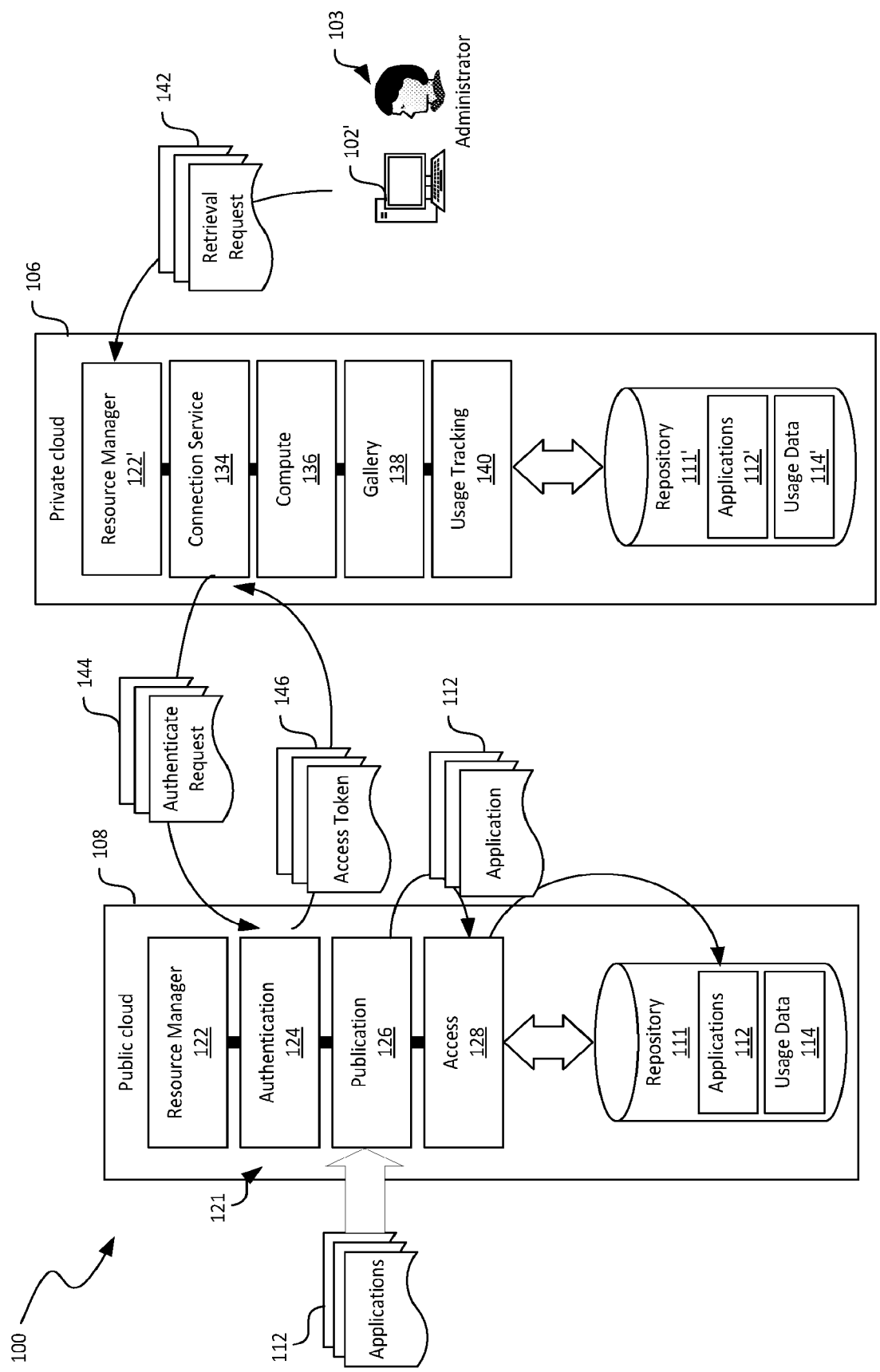
FIGS. 3A-3C are schematic diagrams illustrating certain hardware/software components of the hybrid cloud computing system in FIG. 1 during certain stages of publishing applications from a public cloud computing system to a private cloud computing system.
Figure 3B:
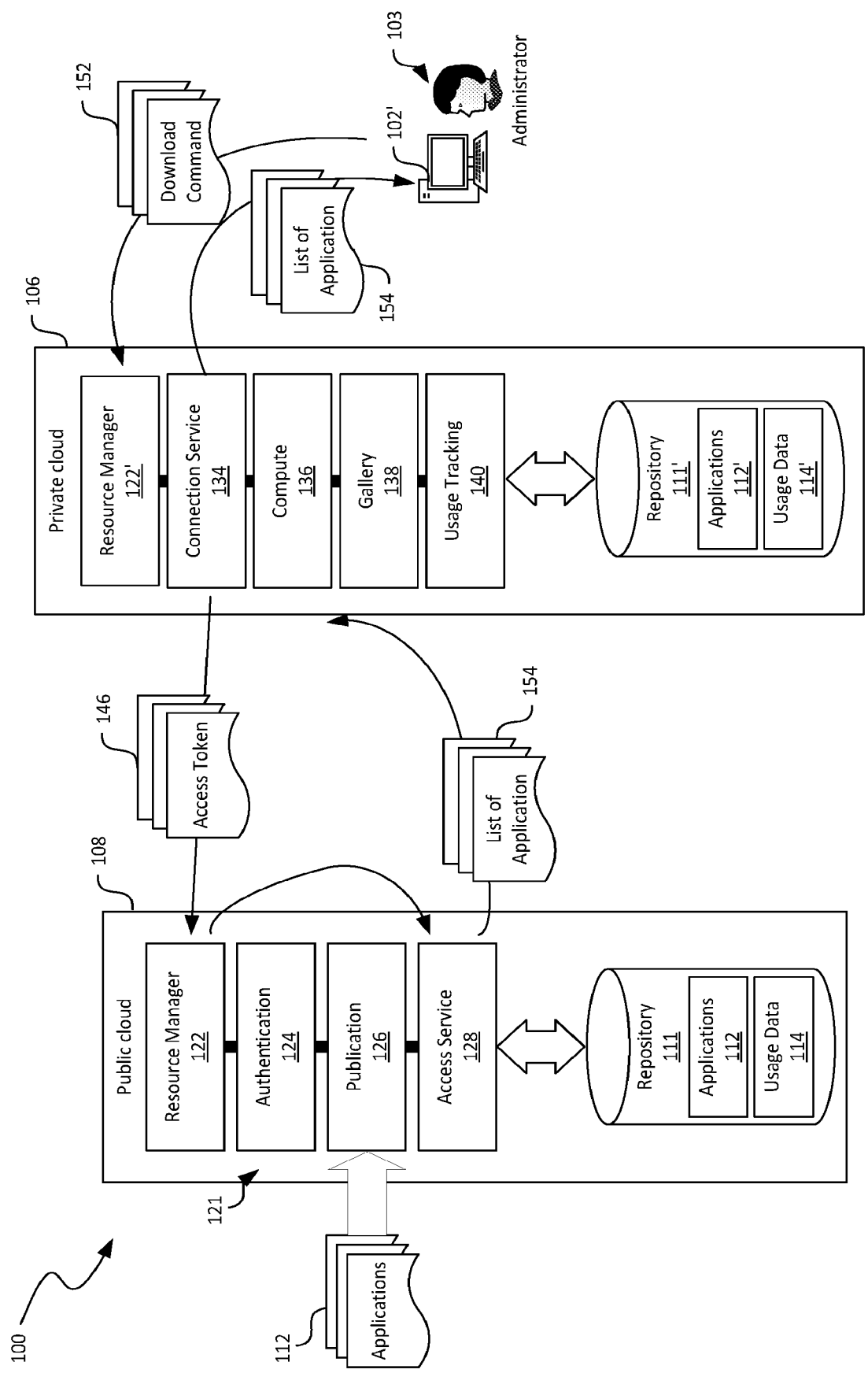
Figure 3C:
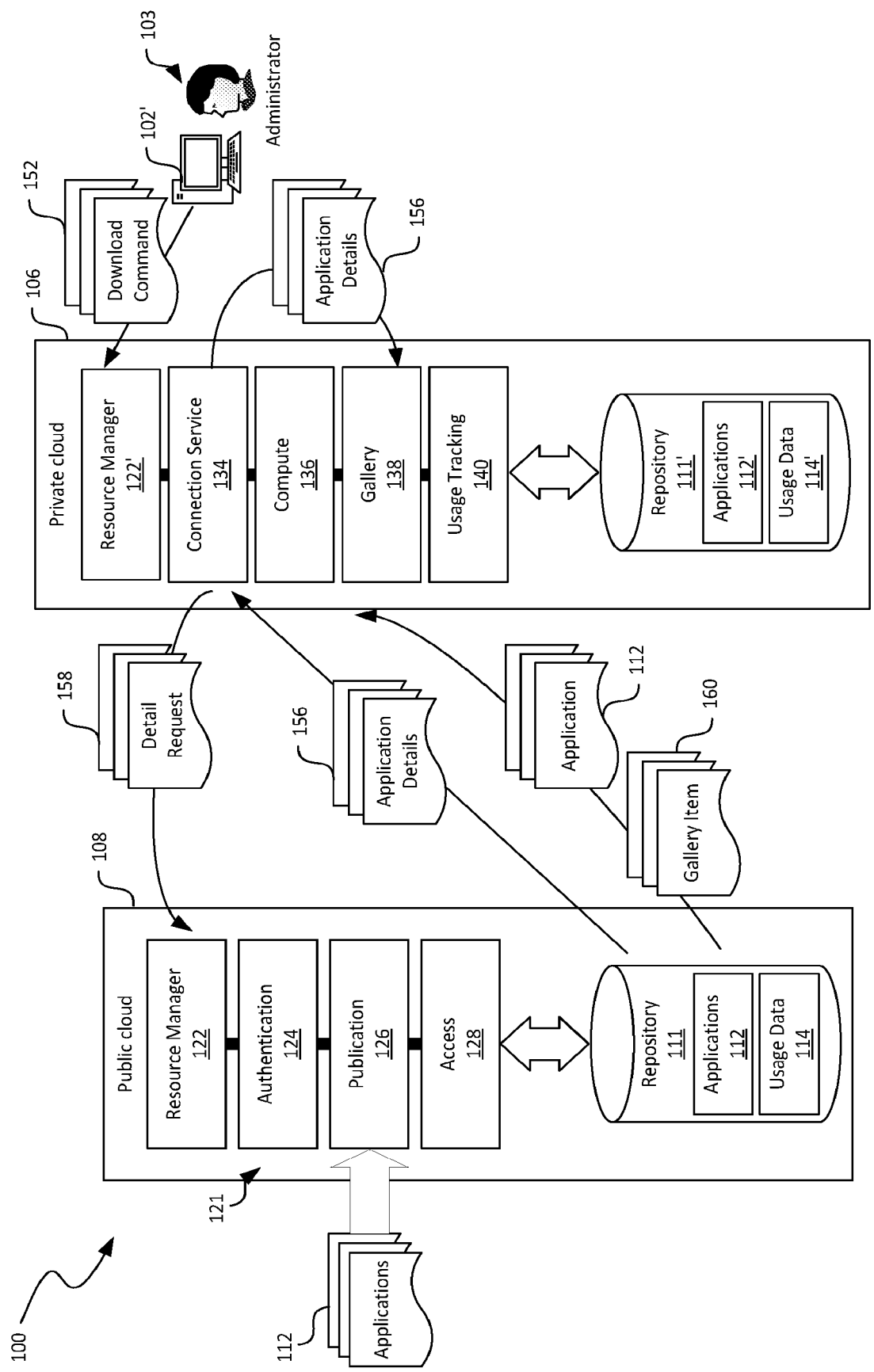

FIGS. 3A-3C are schematic diagrams illustrating certain hardware/software components of the computing system 100 in FIG. 2A during certain stages of publishing applications from a public cloud to a private cloud. In FIGS. 3A-3C, certain components of the hybrid cloud computing system 100 are omitted for clarity. For example, only one private cloud 106 is shown in FIGS. 3A-3C for illustration purposes. Other and/or additional private clouds can have similar components and associated operations as those shown in FIGS. 3A-3C.

In addition, in FIGS. 3A-3C and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). In certain embodiments, the various components and modules described below can be implemented with actors. In other embodiments, generation of the application and/or related services can also be implemented using monolithic applications, multi-tiered applications, or other suitable components.

Components within a system can take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry.

A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 3A, the public cloud 108 can include a resource manager 122 configured to facilitate management of various resources at the public cloud 108. The public cloud 108 can also include various resource providers 121 configured to provide the various resources. For example, in the illustrated embodiment, the public cloud 108 can include an authentication service 124, a publication service 126, and an access service 128 operatively coupled to one another. Each of the foregoing services can be a cloud service provided by the computing fabric 114 (FIG. 2A) via execution of suitable instructions on one or more of the nodes 105 (FIG. 2A). The public cloud 108 can also include a repository 111 containing records of applications 112 and usage data 114. The repository 111 can include a database or other suitable network storage in the public cloud 108. Even though particular components of the public cloud 108 are shown in FIG. 3A, in other embodiments, the public cloud 108 can also include storage services, computing services, web services, database services, or other suitable types of resource providers.

The resource manager 122 can be configured to deploy, monitor, and/or manage resources in the public cloud 108 that is available to a subscriber (e.g., a user 101 in FIG. 1). The resource manager 122 can allow a subscriber to interact with available resources as a group. For example, the resource manager 122 can allow deployment, update, or deletion of one or more available resources in a coordinated operation. The resource manager 122 can also be configured to provide security, auditing, and tagging features to facilitate management of resources after deployment. Even though the public cloud 108 is shown in FIG. 3A as having the resource manager 122, in other embodiments, the resource manager 122 may be omitted. In such embodiments, a subscriber can manage various available resources in the public cloud 108 individually, separately, or in other suitable manners.

The authentication service 124 can be configured to support various authentication and authorization protocols. For example, in certain embodiments, the authentication service 124 can be configured to support single key or multi-key authentication. In other embodiments, the authentication service 124 can also be configured to support key rollover. In yet other embodiments, the authentication service 124 can also be configured to support granting limited access to HTTP or other suitable services, by orchestrating an approval interaction between a user and the services, or by allowing the user to obtain the limited access by itself. One example authentication service 124 is the Azure® Active Directory service provided by Microsoft Corporation of Redmond, Washington. In one embodiment, the authentication service 124 can be a part of a cloud computing platform of the public cloud 108. In other embodiments, the authentication service 124 can be a standalone service, application, or other suitable component.

The publication service 126 can be configured to receive from ISVs or other suitable sources and provide access of applications 112 to the users 101 (FIG. 1) of the public cloud 108. In certain embodiments, ISVs can develop SaaS applications and submit the developed SaaS applications to the publication service 126. In turn, the publication service 126 can be configured to validate the submitted SaaS applications to ensure compatibility with the cloud computing platform, absence of malware, or other suitable purposes. The publication service 126 can also be configured to categorize, classify, or otherwise identify one or more characteristics of the application 112.

The publication service 126 can then be configured to store one or more copies of various artifacts of the applications 112 in, for example, a repository 111 or other suitable network storage (not shown) in the public cloud 108. As used herein, the term "artifact" generally refers to by-products produced during development of a piece of software. For example, use cases, class diagrams, other Unified Modeling Language (UML) models, requirements, design documents, or other suitable types of artifacts can help describe function, architecture, and/or design of an application 112. Other artifacts can contain information related to a development process of the application, such as project plans, business cases, and risk assessments.

In certain embodiments, the publishing service 126 can also publish artifacts of certain applications 112 to the access service 128. For example, in one embodiment, when an ISV submits an application 112, the ISV can elect to have the application 112 also be published to the private cloud 106. In response to receiving the submit application 112, the publication service 126 can then inform, publish, or otherwise make the access service 128 aware of the submitted application 112. In other embodiments, all submitted applications 112 can be published to the access service 128 by default. In further embodiments, certain categories, classes, groups, or types of applications 112 can be automatically published to the private cloud 106 by default.

The access service 128 can be configured to interface with a connection service 134 in the private cloud 106. The access service 128 can be configured to expose various available resources of the public cloud 108 to the private cloud 106 as well as facilitating usage data upload from the private cloud 106 to the public cloud 108. For example, in certain embodiments, the access service 128 can be configured to provide a list of applications 112 to the connection service 134. The applications 112 in the list are available to be published in the private cloud 106, as described in more detail below.

As shown in FIG. 3A, the private cloud 106 can include a resource manager 122', a connection service 134, a compute service 136, a gallery service 138, and a usage tracking service 140 operatively coupled to a repository 111'. The resource manager 122' and the repository 111' can be generally similar to those of the public cloud 108. For example, the resource manager 122' can be configured to facilitate the administrator 103 to deploy, monitor, and/or manage resources in the private cloud 106. The repository 111' can be configured to store records of applications 112' published in the private cloud 106 as well as usage data 114' in the private cloud 106.

The connection service 134 can be configured to interface with the access service 128 of the public cloud 108 while maintaining strict access control of the private cloud 106. In certain embodiments, the connection service 128 can be associated with a subscription to the access service 128 of the public cloud 108. Based on the subscription, the connection service 134 can be authenticated and connected to the access service 128 to perform various operations. For example, the connection service 134 can retrieve a list of applications 112 that are available to be published in the private cloud 106. The connection service 134 can also be configured to retrieve details (e.g., executables) of the applications 112 from the public cloud 108 and facilitate publication of the applications 112 in the private cloud 106, as described in more detail below with reference to FIGS. 3B and 3C. The compute service 136 can be configured to provide computational resources to users 101 and/or other services of the private cloud 106. For example, in one embodiment, the compute service 136 can be configured to instantiate a virtual machine for retrieving details of the applications 112 from the public cloud 108, as described in more detail below with reference to FIGS. 3B and 3C.

The gallery service 138 can be configured to provide resources that facilitate generation, publication, and/or modification of gallery items individually corresponding to an application 112' in the repository 111'. For example, in one embodiment, the gallery service 138 can create one or more gallery items based on requests from the connection service 134. In other embodiments, the gallery service 138 can also create, modify, or perform other operations on the gallery items based on input from the administrator 103 or from other suitable entities.

The usage tracking service 140 can be configured to track usage (e.g., an elapsed time of use) of the applications 112' and/or other software in the private cloud 106. For example, in one embodiment, a user 101 (FIG. 1) can deploy and execute a published application 112' in the private cloud 106. The usage tracking service 140 can track a duration of use related to the application 112' and create or update records of usage data 114' in the repository 111'. In other embodiments, the usage tracking service 140 can also be configured to report accumulated usage data 114' to the public cloud 108, as described in more detail below with reference to FIG. 4.

FIG. 3A illustrates operations of retrieving a list of applications 112 suitable to be published in the private cloud 106 from the public cloud 108. As shown in FIG. 3A, in operation, ISVs (not shown) can submit applications 112 to the public cloud 108. In response to receiving the submitted applications 112, the publication service 126 can validate and publish the applications 112 to be accessible by users 101 of the public cloud 108. The publication service 126 can also publish one or more applications 112 suitable to be published in the private cloud 106 to the access service 128. In response, the access service 128 stores various artifacts of the applications 112 in the repository 111.

In certain embodiments, the administrator 103 of the private cloud 106 can initiate a retrieval process for the list of applications 112 by submitting a retrieval request 142 to, for example, the resource manager 122'. The resource manager 122' can then invoke the connection service 134 to access the public cloud 108. In response, the connection service 134 can transmit an authenticate request 144 to the public cloud 108 with keys, passwords, or other suitable credentials. In response, the authentication service 124 at the public cloud 108 can authenticate the connection service 134 and transmit an access token 146 to the connection service 134 upon authentication.

As shown in FIG. 3B, the connection service 134 can then call the resource manager 122 at the public cloud 108 with the access token to retrieve the list of applications 112. In response, upon validation of the access token 146, the resource manager 122 calls the access service 128 for the list of applications 112. The access service 128 can then provide the list of applications 154 to the connection service 134, which in turn can display or otherwise output the list of applications 154 to the administrator 103, for example, on the client device 102'.

The administrator 103 can then select one, some, or all of the applications 112 in the list of applications 154 and issue a download command 152 to the resource manger 122' to initiate a download process to retrieve the selected applications 112. In response, the connection service 134 can transmit a detail request 158 to the resource manager 122 at the public cloud 108 to create a registration resource related to the applications 112 and request application details 156 of the applications 112 to be downloaded. The requested application details can include connection information such as shared access signature ("SAS") keys, network locations, download sizes, or other suitable parameters related to the applications 112.

In response to receiving the detail request 158, the access service 128 generates the requested application details 156. In one example, the access service 128 can create SAS keys to a storage account in the repository 111 that is related to the applications 112 to be downloaded. In other embodiments, the access service 128 can generate other suitable data of the application details 156 in other suitable manners. The access service 128 can then provide the generated application details 156 to the connection service 134 in the private cloud 106.

The connection service 134 can then create a compute resource (e.g., a virtual machine) in the resource manager 122' at the private cloud 106 and pass the application details 156 (e.g., the SAS keys) to the created compute resource. With the application details 156, the compute service 136 can then utilize the create compute resource to download various artifacts of the applications 112 (e.g., application images, extensions, etc.) from the repository 111 of the public cloud 108 and store the downloaded artifacts in the repository 111' of the private cloud 106.

The connection service 134 can then create a gallery item resource in the resource manager 122' of the private cloud 106 and pass the application details 156 to the gallery service 138. With the application details 156, the gallery service 138 can then download one or more gallery items 160 from the repository 111 at the public cloud 108 and associate the downloaded gallery items 160 with the applications 112' stored in the repository 111' at the private cloud 106. Optionally, the connection service 134 can also transmit a status update (not shown) to the resource manager 122 at the public cloud 108 to update the registration resource with a success or failure outcome.

Several embodiments of the disclosed technology can thus allow the private cloud 106 access to published applications 112 in the public cloud 108 without compromising string access control in the private cloud 106. As described above, the public cloud 108 does not have direct access to any resources in the private cloud 106 during the foregoing publication process in the private cloud 106. Instead, the access service 128 merely exposes certain information of available resources at the public cloud 108 and allow the private cloud 106 to decide whether and/or which applications 112 are to be published in the private cloud 106.

Figure 3D:
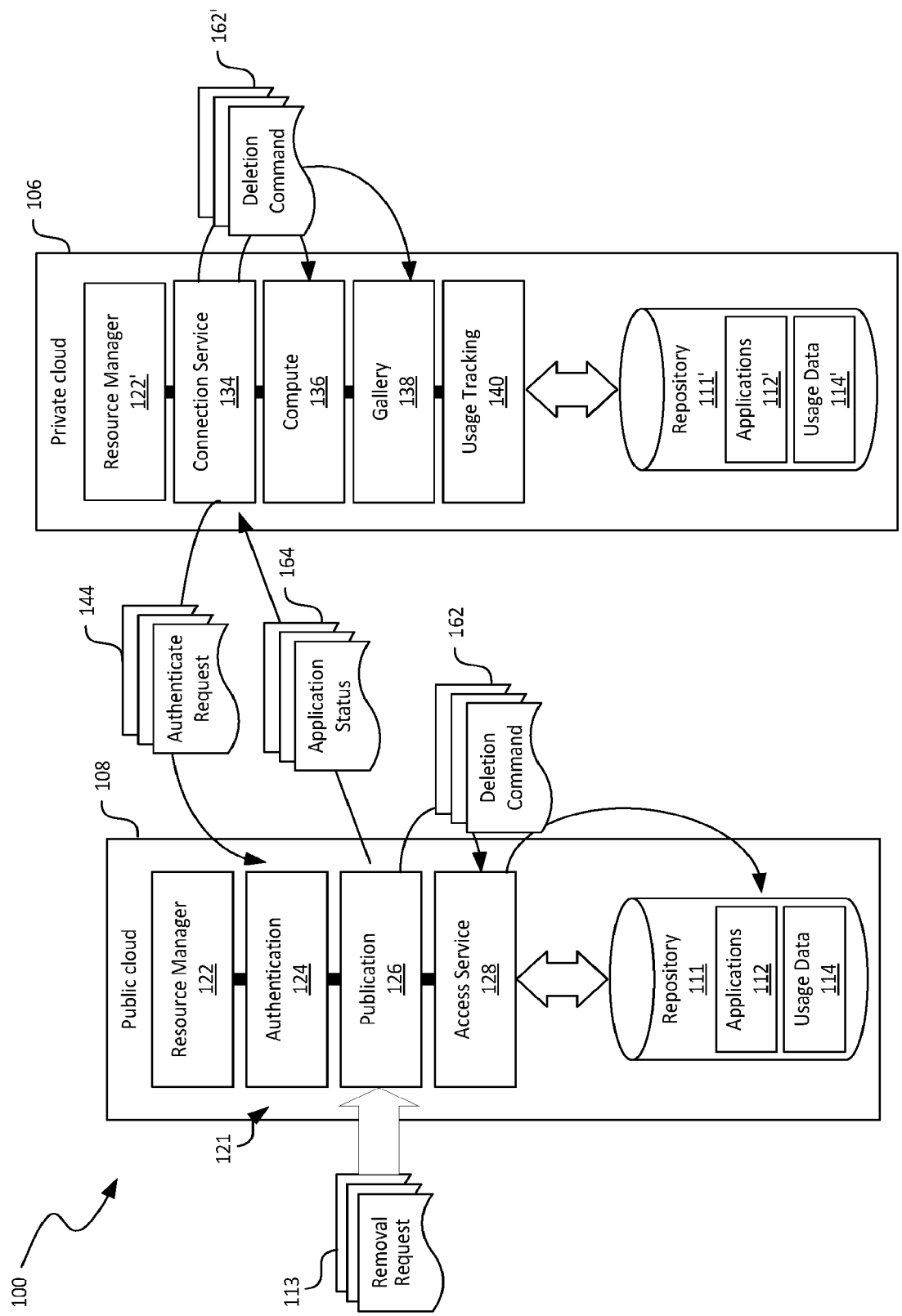
FIG. 3D is a schematic diagram illustrating certain hardware/software components of the hybrid cloud computing system in FIG. 1 during certain stages of removing a published application previously published in a private cloud computing system.

The access service 128 of the public cloud 108 can also facilitate deletion or "un-publication" of published applications 112' in the private cloud 106. As shown in FIG. 3D, an ISV can submit a removal request 113 to the public cloud 108 to remove one of the applications 112 from the public cloud 108. In response to receiving the removal request 113, the publication service 126 can inform the access service 128 that the application 112 is to be deleted. The access service 128 can then delete all artifacts related to the application 112 from the repository 111 at the public cloud 108. The access service can also set a state of a registration resource related to the deleted application 112 to a decommissioned state. Upon a subsequent authentication of an authentication request 144 from the connection service 134 at the private cloud 106, the connection service 134 can discover that the registration resource related to the deleted application 112 has been set to a decommissioned state. In response, the connection service 134 deletes a gallery item and a computer resource corresponding to the deleted application 112 from the gallery service 138 and the compute service 136, respectively.

Figure 4:
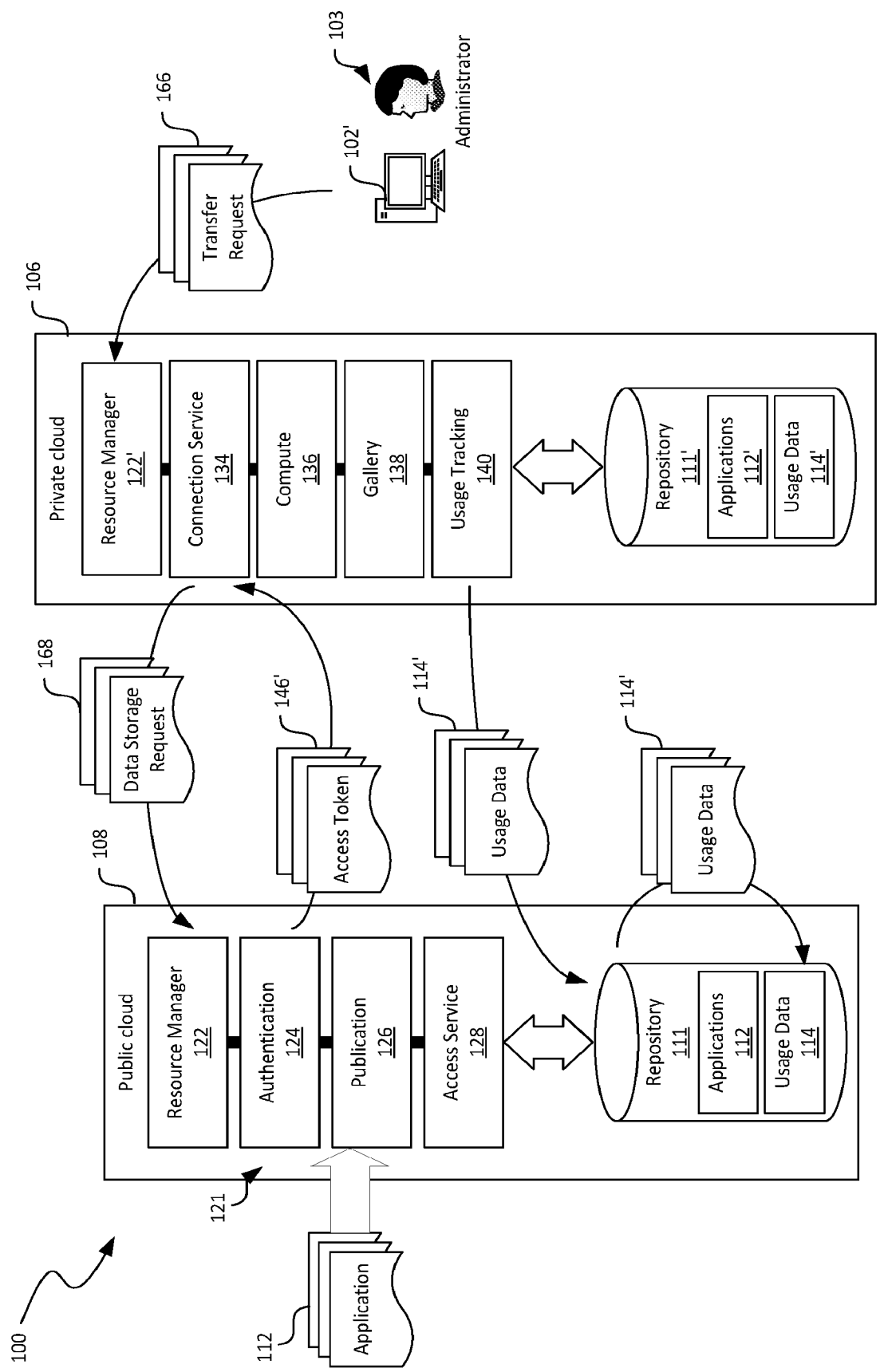
FIG. 4 is a schematic diagram illustrating certain hardware/software components of the hybrid cloud computing system in FIG. 1 during certain stages of uploading usage data from a private cloud computing system to a public cloud computing system.

FIG. 4 is a schematic diagram illustrating certain hardware/software components of the hybrid cloud computing system 100 in FIG. 1 during certain stages of uploading usage data from a private cloud 106 to a public cloud 108. In the following description, discussions of certain operations are omitted for clarity. For example, the authentication operations shown in FIG. 3A are not shown in FIG. 4 though such operations are performed each time the connection service 134 accesses the access service 128 at the public cloud 108. Even though the discussion below uses interactions between the public cloud 108 and the private cloud 106 to illustrate various aspects of the disclose technology, in other embodiments, the operations discussed below can also be applied between interactions between two or more public clouds 108 (not shown) that are, for instance, managed by different administrative entities or otherwise segregated.

In the illustrated embodiment, the administrator 103 can request a usage data transfer from the private cloud 106 to the public cloud 108 by issuing a transfer request 166. In response, the connection service 134 can transmit a data storage request 168 to the resource manager 122 at the public cloud 108 to request access to store usage data 114' in the public cloud 108. In other embodiments, the connection service 134 or other components of the private cloud 106 can initiate such usage data uploads on a periodic, continuous, or other suitable basis. In certain embodiments, the usage data 114' can include one or more durations of use of software deployed in the private cloud 106, for instance, software of a cloud computing platform deployed in the private cloud 106 and/or one or more applications executed on the cloud computing platform in the private cloud 106 to provide various cloud services to users 101 of the private cloud 106. In other embodiments, the usage data 114' can also include or otherwise associated with a digital signature to indicate to the public cloud 109 that the usage data 114' is indeed from the private cloud 106. Example digital signatures can be generated via, for instance, a cryptographic hash function to convert all or part of the usage data 114' into a string, number, or other suitable identifiers. Analyzing such digital signatures can provide non-repudiation to the public cloud 108 to track, verify, and prove the uploaded usage data 114' is indeed received from the private cloud 106, and that the usage data 114' has not been altered during transmission.

In response to receiving the data storage request 168, the access service 128 can generate an access token 146' granting the connection service 134 access to store data in the public cloud 108. In one example, the access token 146' can include connection information such as an SAS key. In other examples, the access token 146' can include an access code, password, or other suitable token. The connection service 134 can then pass the received access token 146' to the usage tracking service 140, which in turn uploads some or all of the usage data 114' in the repository 111' to the repository 111 of the public cloud 108 under a storage account associated with the connection service 134.

The access service 128 can then copy, move, or otherwise obtain the uploaded data 114 from the storage account associated with the connection service 134 and store the usage data 114 in another storage account associated with the access service 128 at the public cloud 108. The access service 128 can then cause performance of various post-processing operations on the obtained usage data 114. For example, the access service 128 can cause performance of filtering, sorting, categorizing, anomaly detection, telemetry, or other suitable operations on the usage data 114 in the another storage account associated with the access service 128. In another example, the access service 128 can also cause transformation of the uploaded usage data 114 when the usage data 114 at the public cloud 108 becomes out-of-sync with the usage data 114' at the private cloud 106 due to, for instance, different schedules of change/update in the public cloud 108 and the private cloud 106. Example transformation can include re-aligning the usage data 114 and 114' based on timestamps or other suitable markers, deleting duplicate entries, combining certain entries, or other suitable operations.

The access service 128 can then push or otherwise transfer the post-processed usage data 114 to other suitable services for further processing. For example, a billing service in the public cloud 108 can generate charges or bills for the users 101 of the private cloud 106 for using software of the cloud computing platform and/or applications executed on the cloud computing platform in the private cloud 106. In other examples, a service suspension service can suspend the service subscription associated with the connection service 134 of the private cloud 106 when one or more bills are overdue, a service suspension request is received, or under other suitable conditions.

Figure 5:
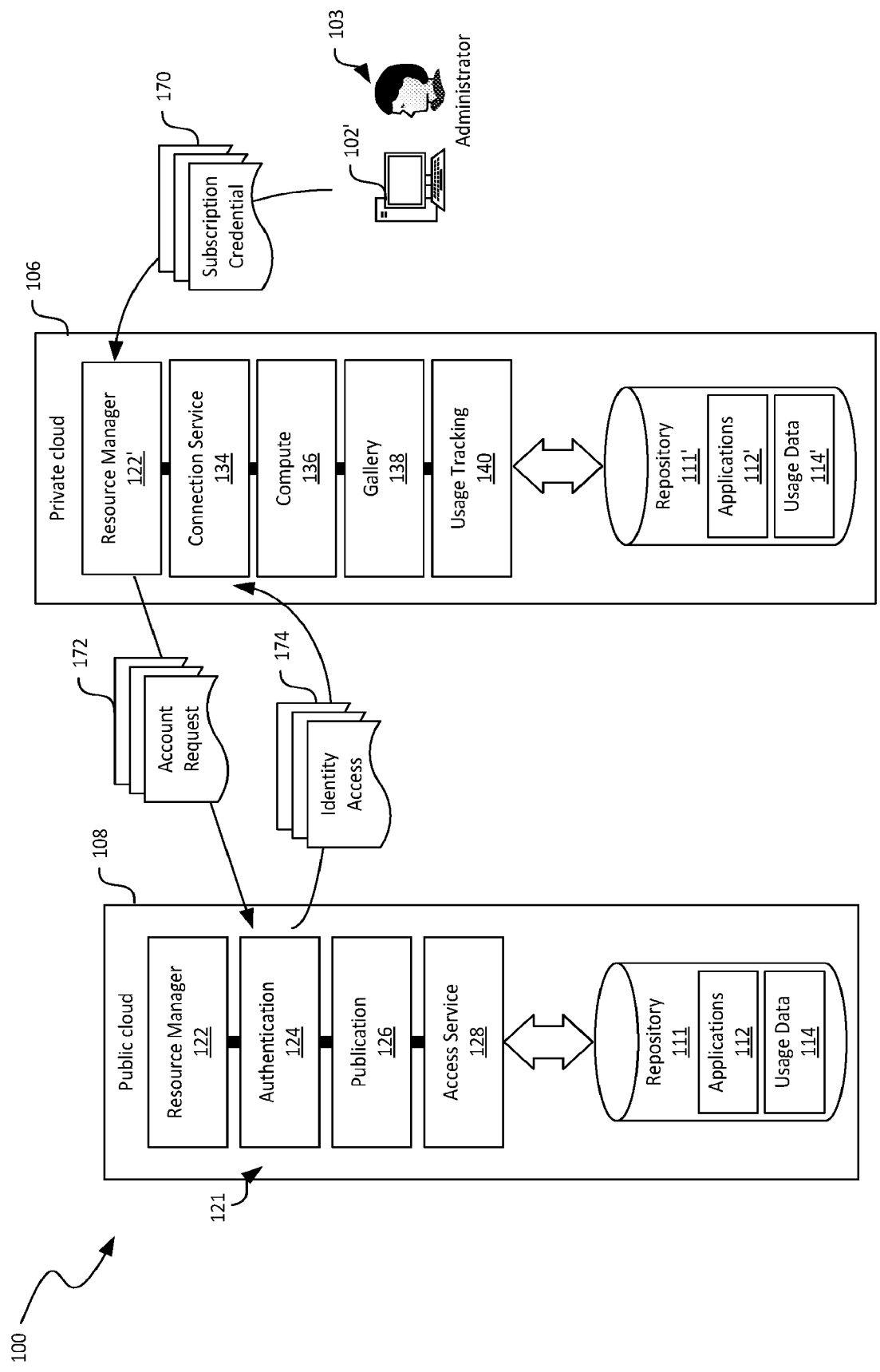
FIG. 5 is a schematic diagram illustrating certain hardware/software components of the hybrid cloud computing system in FIG. 1 during certain stages of configuring a service subscription to a public cloud computing system for a connection service in a private cloud computing system.

FIG. 5 is a schematic diagram illustrating certain hardware/software components of the hybrid cloud computing system 100 in FIG. 1 during certain stages of configuring a service subscription to a public cloud 108 for a connection service 134 in a private cloud 106. As shown in FIG. 5, the administrator 103 can initiate a configuration process by providing subscription credential 170 (e.g., subscription password, key, etc.), invoking a power shell script, or perform other suitable operations. In response, the connection service 134 calls the authentication service 124 at the public cloud 108 with an account request 172 to create a service account for the connection service 134 based on the service credential 170. In response to the received account request 172, the authentication service 124 provides an identity access 174 to the connection service 134 at the private cloud 106 upon authentication of the subscription credential 170. Based on the identity access 174, the connection service 134 can be configured for accessing the resource manager 122 at the public cloud 108. Subsequently, a registration resource for the connection service 134 can be created at the access service 128.

FIGS. 6A-6D are flowcharts illustrating various aspects of processes of facilitating operations between the public cloud 108 and the private cloud 106 of FIG. 1 in accordance with embodiments of the disclosed technology. Even though the processes are described below with reference to the hybrid cloud computing system 100 of FIGS. 1-5, in other embodiments, embodiments of the processes can be performed in other computing systems with additional and/or different components.

Figure 6A:
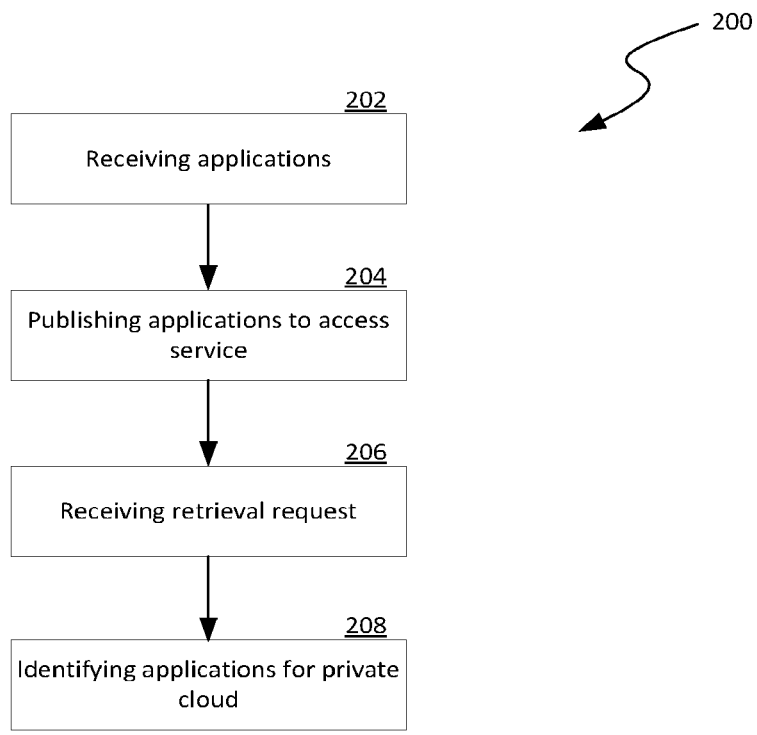
FIGS. 6A-6D are flowcharts illustrating various aspects of processes of facilitating operations between a public cloud computing system and a private cloud computing system in accordance with embodiments of the disclosed technology.

FIG. 6A is a flowchart illustrating a process 200 of providing a list of available applications at the public cloud 108 to the private cloud 106 in accordance with embodiments of the disclosed technology. As shown in FIG. 6A, the process 200 can include receiving one or more applications to be published in the public cloud 108 from ISVs or other suitable entities at stage 202. The applications can be developed to provide solutions on a cloud computing platform common to both the public cloud and the private cloud 106. In certain embodiments, some or all of the applications can be marked to be published to both the public cloud 108 and the private cloud 106 by default. In other embodiments, the ISVs or other suitable entities can select whether to publish the applications to the private cloud 106.

The process 200 can also include publishing the applications to an access service at the public cloud 108 at stage 204. In certain embodiments, publishing the applications to the access service at the public cloud 108 includes providing various artifacts of the applications to the access service, which in turn can store the received artifacts in a network storage such as the repository 111 in FIG. 3A. The process 200 can further include receiving a retrieval request from a connection service in the private cloud 106 at stage 206. The connection service can be associated with a service subscription to the public cloud 108. In response to the received retrieval request, the process 200 can further include identifying and transmitting, via the access service of the public cloud 108, a list of applications available to the private cloud 106 based on the service subscription associated with the connection service of the private cloud 106 at stage 208.

Figure 6B:
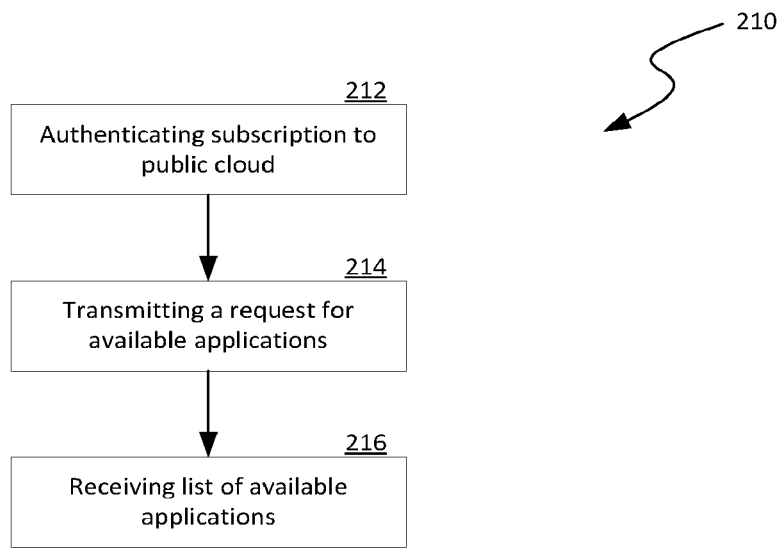

FIG. 6B is a flowchart illustrating a process 210 of retrieving a list of available applications from the public cloud 108 in accordance with embodiments of the disclosed technology. As shown in FIG. 6B, the process 210 can include authenticating a service subscription to the public cloud 108 at stage 212. In certain embodiments, authenticating the service subscription includes submitting various types of subscription credentials to the public cloud 108. In other embodiments, the service subscription can be authenticated via other suitable means. The process 210 can also include transmitting a request for a list of available applications upon authentication at stage 214. In response, the process 210 can include receiving a list of available applications at the private cloud 106 from the public cloud 108.

Figure 6C:
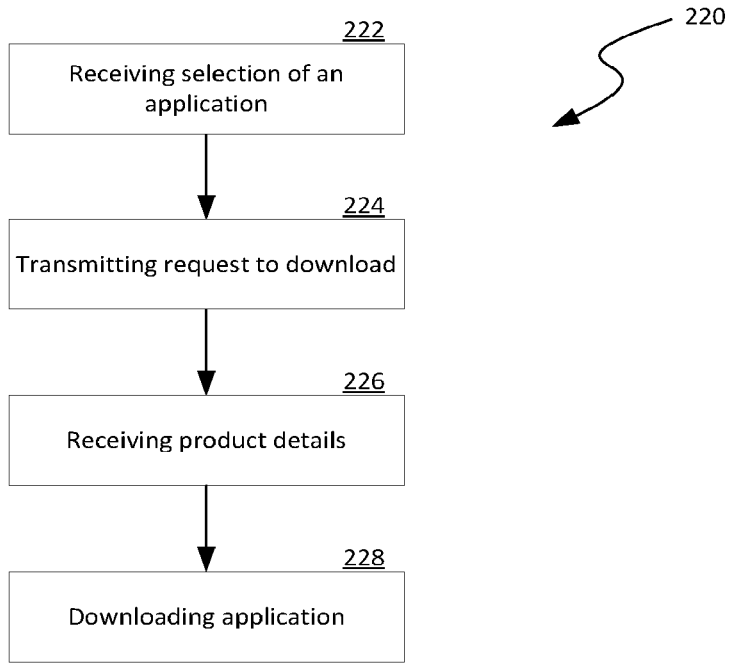

FIG. 6C is a flowchart illustrating a process 220 of downloading applications from the public cloud 108 in accordance with embodiments of the disclosed technology. As shown in FIG. 6C, the process 220 can include receiving a selection of one or more applications from a list of available applications at the public cloud 108 at stage 222. The process 220 can then include transmitting a request to download the selected applications at stage 224. The process 220 can further include receiving product details of the selected applications from the public cloud 108 at stage 226. In certain embodiments, the product details can include SAS keys or blobs associated with the selected applications. In other embodiments, the product details can include other suitable information associated with the selected applications. The process 220 can then include downloading the selected applications based on the received product details at stage 228. In certain embodiments, downloading the selected applications can include instantiating a virtual machine, and retrieving the selected applications utilizing the instantiated virtual machine. In other embodiments, downloading the selected applications can include other suitable file retrieval techniques.

Figure 6D:
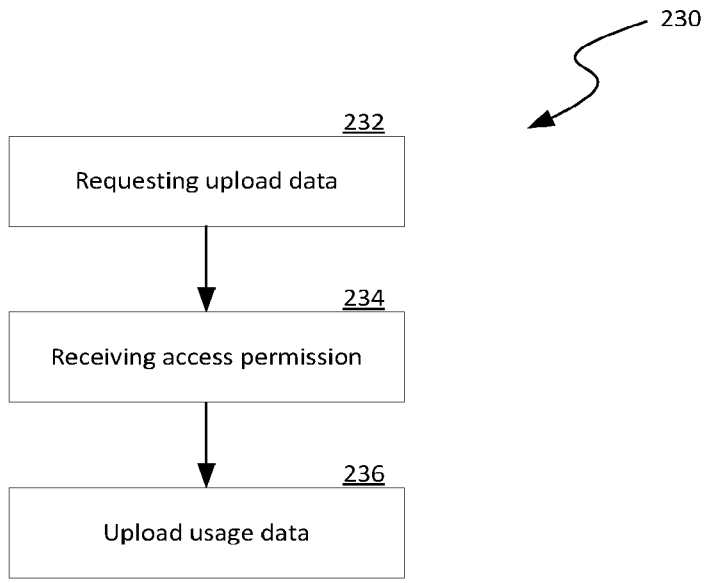

FIG. 6D is a flowchart illustrating a process 230 of uploading usage data from the private cloud 106 to the public cloud 108 in accordance with embodiments of the disclosed technology. As shown in FIG. 6D, the process 230 can include requesting permission to upload usage data at stage 232. In certain embodiments, requesting permission can include submitting subscription credentials to the public cloud 108. In other embodiments, requesting permission can include submitting other suitable credentials to the public cloud 108. The process 230 can then include receiving an access permission from the public cloud 108 at stage 134. In one embodiment, the access permission can include an SAS key granting limited access to a storage account in a network storage in the public cloud 108. The storage account is associated with the private cloud 106. In other embodiments, the access permission can include an access token or other suitable types of permission. The process 230 can then include uploading the usage data at the private cloud 106 to the network storage of the public cloud 108 using the received access permission.

Even though particular operations are shown for the processes illustrated in FIGS. 6A-6D, in other embodiments, certain operations may be combined into a single operation. For example, in the process 230 of FIG. 6D, the operation of uploading usage data at stage 236 may be combined with requesting to upload data at stage 232 by submitting, from the private cloud 106 (FIG. 4), the data storage request 168 (FIG. 4) with associated credentials, and the usage data 114' (FIG. 4) as a single package to the public cloud 108 (FIG. 4). During authentication, the public cloud 108 can hold the uploaded usage data 114' in a temporary storage space, a buffer, or other suitable location. Upon authentication, the public cloud 108 can store the received usage data 114' in the account associated with the connection service 134 (FIG. 4) of the private cloud 106.

Figure 7:
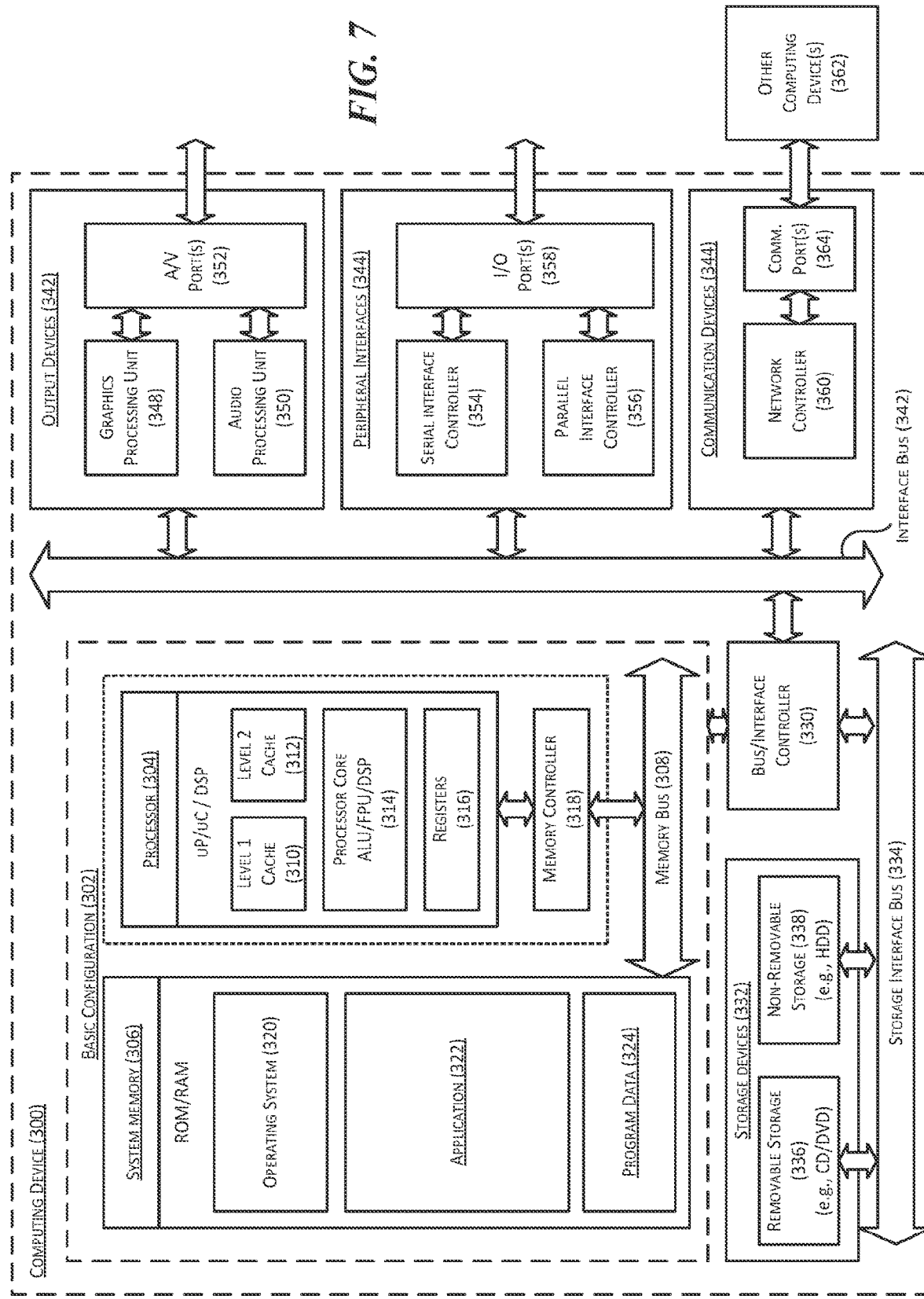
FIG. 7 is a computing device suitable for certain components of the hybrid cloud computing system in FIG. 1.

FIG. 7 is a computing device 300 suitable for certain components of the hybrid cloud computing system 100 in FIG. 1. For example, the computing device 300 can be suitable for the nodes 105 or the client devices 102 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations, memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of facilitating operations between a public cloud computing system interconnected with a private cloud computing system via a computer network, the method comprising:

exposing, at the public cloud computing system, one or more applications deployable in the private cloud computing system to an access service of the public cloud computing system, the access service being configured to respond to one or more requests from a connection service of the private cloud computing system without directly accessing resources in the private cloud computing system;

receiving, from the connection service of the private cloud computing system, a request for applications that are deployable in the private cloud computing system; and in response to the received request, determining a list of at least one of the one or more applications based on a service subscription of the connection service at the public cloud computing system; and transmitting, via the computer network, from the access service of the public cloud computing system to the connection service of the private cloud computing system, the determined list of at least one of the one or more applications;

making available the one or more applications to users of the public cloud; and storing artifacts of the one or more applications in a network storage controllably accessible by the private cloud computing system.

2. The method of claim 1, further comprising:

receiving an authentication request from the connection service of the private cloud computing system;

in response to the received authentication request, authenticating the connection service of the private cloud computing system based on the service subscription associated with the connection service of the private cloud computing system; and wherein transmitting the list includes transmitting the list to the private cloud computing system upon authentication of the connection service of the private cloud computing system.

3. The method of claim 1, further comprising:

receiving an authentication request from the connection service of the private cloud computing system;

in response to the received authentication request, transmitting an access token to the private cloud computing system based on the service subscription associated with the connection service of the private cloud computing system; and wherein receiving the request includes:
   receiving the request from the private cloud computing system along with the access token;
   determining whether the access token is valid; and
   in response to determining that the access token is valid, transmitting the list to the private cloud computing system.

4. The method of claim 1, further comprising:
   receiving an authentication request from the connection service of the private cloud computing system;
   in response to the received authentication request, transmitting an access token to the private cloud computing system based on the service subscription associated with the connection service of the private cloud computing system; and
   wherein receiving the request from the private cloud computing system for the list includes:
      receiving the request from the private cloud computing system for the list along with the access token;
      determining whether the access token is valid; and
      in response to determining that the access token is invalid, rejecting the request for the list.

5. The method of claim 1, further comprising:
   receiving multiple applications, at the public cloud computing system, from one or more software vendors; and
   for each of the applications,
      determining whether the corresponding software vendor indicates that the application is deployable to both the public and private cloud computing systems; and
      in response to determining that the corresponding software vendor indicates that the application is deployable to both the public and private cloud computing systems, adding the application to the list.

6. The method of claim 1 wherein transmitting the list includes:
   determining a subset of the one or more applications stored in the network storage of the public cloud computing system based on the service subscription of the connection service of the private cloud computing system; and
   transmitting the determined subset of the one or more applications as the list to the private cloud computing system.

7. A method of facilitating operations between a public cloud computing system interconnected with a private cloud computing system via a computer network, the method comprising:
   transmitting, using a connection service of the private cloud computing system, a request for a list of available applications stored in a network storage at the public cloud computing system, the list of available applications being deployable at the private cloud computing system;
   receiving, via an access service of the public cloud computing system, a list of one or more available applications based on a service subscription of the connection service of the private cloud computing system to the access service of the public cloud computing system, the access service being configured to provide information to the connection service of the private cloud computing system based on the service subscription without having direct access to the private cloud computing system;
   detecting a selection of one of the one or more available applications in the list for deployment; and
   in response to detecting the selection, deploying, in the private cloud computing system, one or more components of the selected one of the one or more available applications.

8. The method of claim 7, further comprising:
   transmitting an authentication request from the connection service of the private cloud computing system to the public cloud computing system, the authentication request including data representing the service subscription associated with the connection service; and
   wherein receiving the list showing available applications includes receiving the list showing available applications upon authentication of the connection service by the public cloud computing system.

9. The method of claim 7, further comprising:
   transmitting an authentication request from the connection service of the private cloud computing system to the public cloud computing system;
   receiving an access token to the access service of the public cloud computing system upon authentication of the connection service by the public cloud computing system; and
   wherein transmitting the request to the public cloud computing system includes transmitting the request for available applications stored in the network storage at the public cloud computing system along with the received access token.

10. The method of claim 7, further comprising:
   transmitting an authentication request from the connection service of the private cloud computing system to the public cloud computing system;
   receiving an access token to the access service of the public cloud computing system upon authentication of the connection service by the public cloud computing system; and
   wherein transmitting the request to the public cloud computing system includes transmitting the request for available applications stored in the network storage at the public cloud computing system along with the received access token; and
   wherein receiving the list of available applications includes receiving the list of available applications based on the access token transmitted along with the request for available applications.

11. The method of claim 7 wherein:
   the public cloud computing system includes a set of available applications stored in the network storage; and
   the service subscription associated with the connection service identifies a subset of the available applications deployable at the private cloud computing system.

12. The method of claim 7, further comprising:
   receiving a user input at the private cloud computing system, the user input requesting the list showing the available applications; and
   wherein transmitting the request for available applications stored in a network storage at the public cloud computing system includes transmitting, using the connection service of the private cloud computing system, the request for available applications stored in the network storage at the public cloud computing system in response to the received user input at the private cloud computing system.

13. A method of facilitating operations between a public cloud computing system interconnected with a private cloud computing system via a computer network, the method comprising:

receiving, from a connection service of the private cloud computing system, a request for a list of applications that are available at the public cloud computing system and deployable in the private cloud computing system, the connection service having a service subscription to an access service at the public cloud computing system; and in response to the received request, at the public cloud computing system, determining the list of applications deployable in the private cloud computing system based on the service subscription of the connection service to the access service at the public cloud computing system;

transmitting via the computer network, from the access service of the public cloud computing system to the connection service of the private cloud computing system, the determined list of applications deployable in the private cloud computing system based on the service subscription of the connection service of the private cloud computing system at the public cloud computing system;

the applications in the list being available to users of the public cloud computing system and to the access service of the public cloud computing system; and wherein the method further includes storing artifacts of the applications in a network storage associated with the access service in the public cloud computing system, the network storage being controllably accessible by the private cloud computing system.

14. The method of claim 13, further comprising:
receiving an authentication request from the connection service of the private cloud computing system;

in response to the received authentication request, authenticating the connection service of the private cloud computing system based on the service subscription associated with the connection service of the private cloud computing system; and wherein transmitting the determined list includes transmitting the determined list to the private cloud computing system upon authentication of the connection service of the private cloud computing system.

15. The method of claim 13, further comprising:
receiving an authentication request from the connection service of the private cloud computing system;

in response to the received authentication request, transmitting an access token to the private cloud computing system based on the service subscription associated with the connection service of the private cloud computing system; and wherein receiving the request from the private cloud computing system for the list of applications includes:
receiving the request from the private cloud computing system for the list of applications along with the access token;

determining whether the access token is valid; and in response to determining that the access token is valid, transmitting the determined list to the private cloud computing system.

16. The method of claim 13, further comprising:
receiving an authentication request from the connection service of the private cloud computing system;

in response to the received authentication request, transmitting an access token to the private cloud computing system based on the service subscription associated with the connection service of the private cloud computing system; and wherein receiving the request from the private cloud computing system for the list of available applications includes:
receiving the request from the private cloud computing system for the list of applications along with the access token;

determining whether the access token is valid; and in response to determining that the access token is invalid, rejecting the request for the list of the applications.

17. The method of claim 13, further comprising:
receiving multiple applications, at the public cloud computing system, from one or more software vendors; and for each of the received applications,
determining whether the corresponding software vendor indicates that the application is deployable to both the public and private cloud computing systems; and in response to determining that the corresponding software vendor indicates that the application is deployable to both the public and private cloud computing systems, adding the application to the list of applications deployable to both the public and private cloud computing systems.

18. The method of claim 13 wherein identifying the list of available applications includes:
determining a subset of the applications stored in the network storage of the public cloud computing system based on the service subscription of the connection service of the private cloud computing system; and identifying the determined subset of available applications to the private cloud computing system.

* * * * *